United States Patent

[11] 3,596,751

| [72] | Inventors | Olle Lennart Siwersson<br>Gartnergatan 4, 252 51 Halsingborg;<br>Karl Gunnar Tell, Malmogatan 3, 252 49<br>Halsingborg, both of, Sweden |
|---|---|---|
| [21] | Appl. No. | 789,583 |
| [22] | Filed | Jan. 7, 1969 |
| [45] | Patented | Aug. 3, 1971 |
| [32] | Priority | Jan. 17, 1968 |
| [33] | | Sweden |
| [31] | | 588/1968 |

[54] DEVICE FOR SUPPLYING MATERIAL TO THE ENTRANCE END OF A CONVEYOR COMPRISING A SCREW AND A CONDUIT THEREFOR
14 Claims, 12 Drawing Figs.

[52] U.S. Cl............................................................ 198/64,
198/217
[51] Int. Cl......................................................B65g 33/20,
B65g 47/16

[50] Field of Search............................................ 198/64,
213, 217; 222/411—413, 381

[56] References Cited
UNITED STATES PATENTS

| 2,467,682 | 4/1949 | Megargee..................... | 198/213 |
| 3,476,296 | 11/1969 | Siwersson.................... | 198/213 X |

FOREIGN PATENTS

| 1,034,480 | 4/1953 | France........................ | 198/213 |

*Primary Examiner*—Edward A. Sroka
*Attorney*—Karl W. Flocks

ABSTRACT: A device for supplying or drawing material to the entrance end of a screw conveyor has a guide surface which is rotatable about the longitudinal axis of the conveyor independently of the screw thereof, and the guide surface is in the form of a helically or spirally coiled vane in an open cap formed by said guide surface around the entrance end of the conveyor.

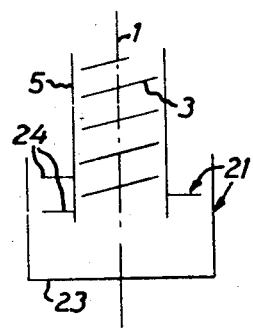
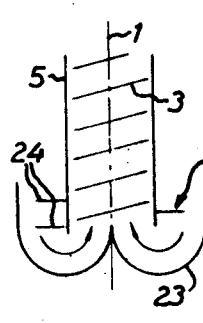
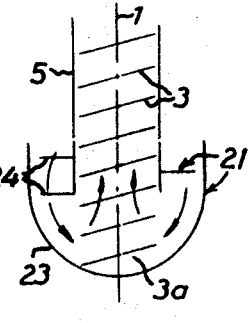
FIG.2      FIG.3      FIG.4
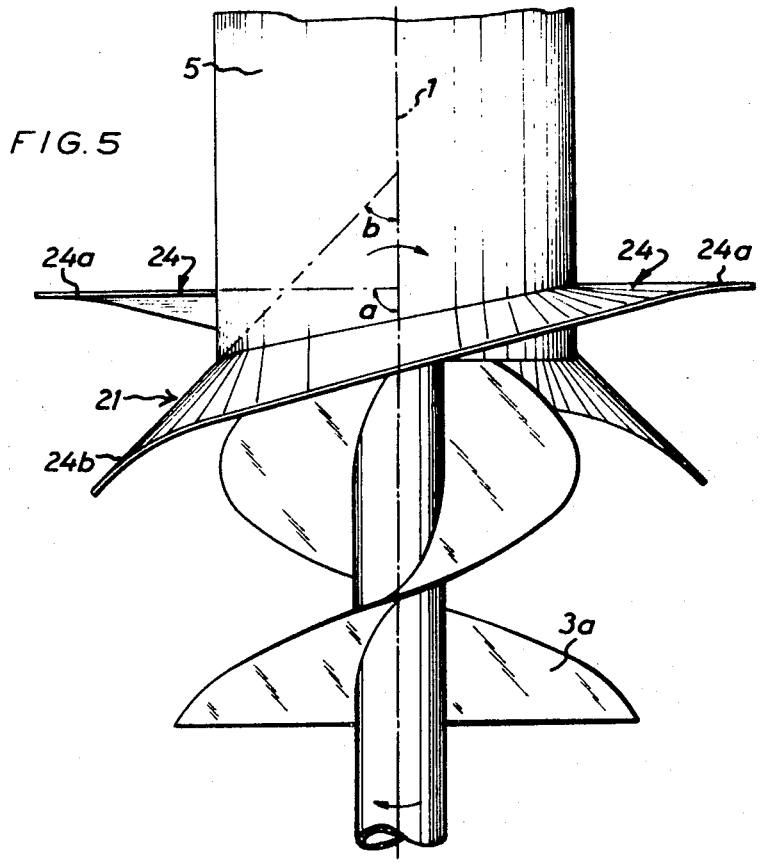
FIG.5

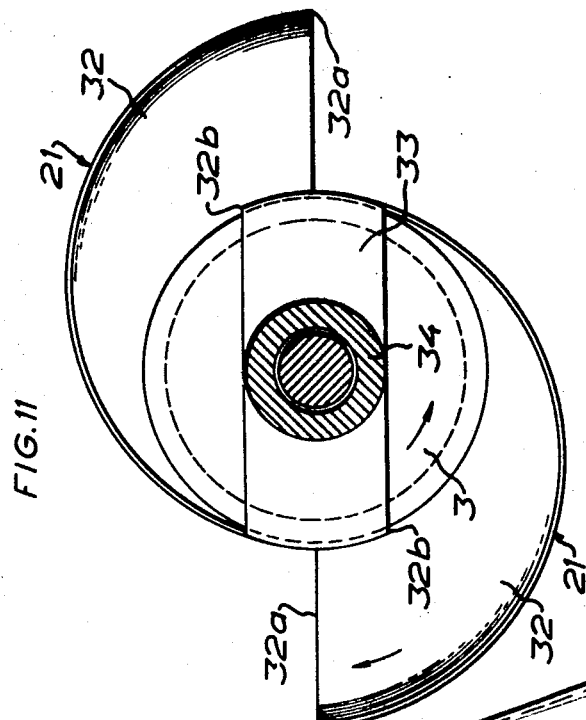
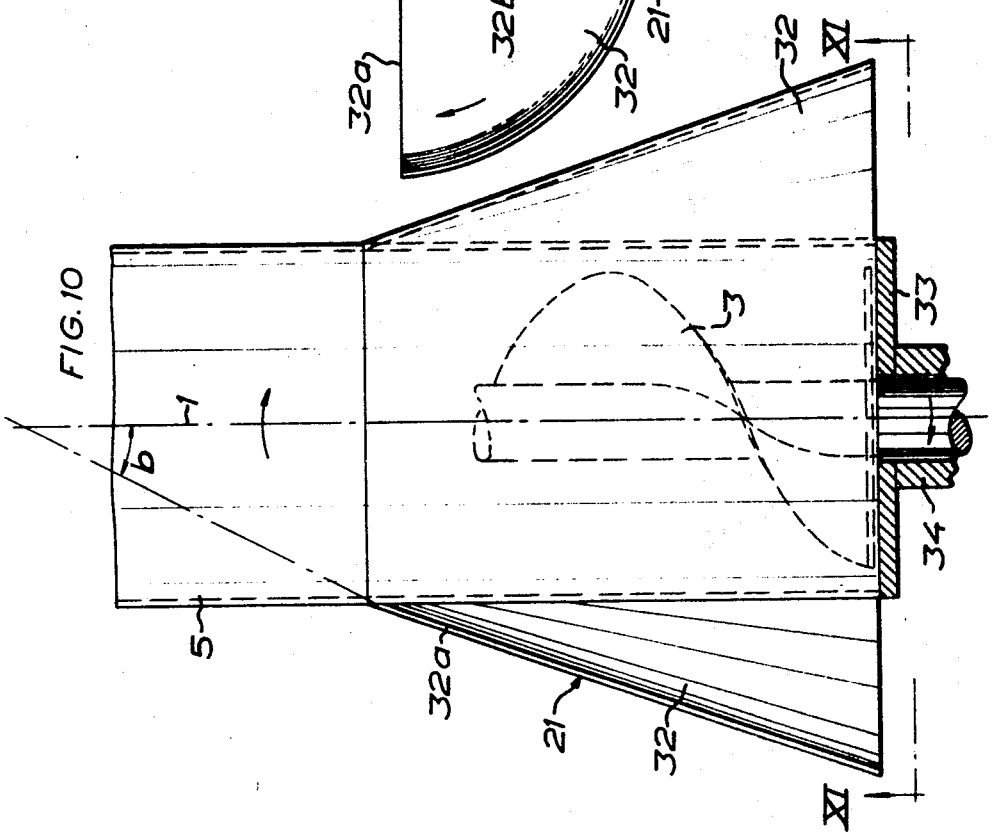
FIG.11
FIG.10

3,596,751

DEVICE FOR SUPPLYING MATERIAL TO THE ENTRANCE END OF A CONVEYOR COMPRISING A SCREW AND A CONDUIT THEREFOR

The invention relates to a device for supplying or drawing material to the entrance end of a conveyor comprising a screw and a conduit therefor. The screw conveyors as hitherto used with a stationary conduit and a screw rotating therein have but small capacity and low efficiency. However, there have been suggested screw conveyors in which both the screw and the conduit therefor rotate about the longitudinal axis of the conveyor, which results in an improved capacity and higher efficiency. For exploiting these favorable properties, particularly at high speeds at which considerable centrifugal forces arise, it has proved necessary to arrange for a positive guidance of the material towards the entrance end of the conveyor, thus positively drawing the material towards the conveyor. Also the properties of the screw conveyors as hitherto used which have a stationary conduit and a screw rotating therein can be improved considerably by such positive guidance of the material to be conveyed. The characteristic features of the device according to the invention reside in that the device includes at least one guide surface in which at least part of the surface is arranged to rotate about the longitudinal axis of the conveyor independently of the screw thereof, and that the guide surface rotatable about the longitudinal axis of the conveyor is formed as a helically or spirally coiled vane in an open cap formed by the guide surface in its entirety around the entrance end of the conveyor.

For better elucidation the invention will be described more in detail in the following with reference to the accompanying drawings illustrating some embodiments of the device.

In the drawings:

FIG. 2 is a diagrammatic section of the device in FIG. 1;

FIG. 3 is a diagrammatic section of a second embodiment of the device;

FIG. 4 is a schematic section of a third embodiment of the device;

FIG. 5 is a side elevation, on a larger scale, of a fourth embodiment of the device;

FIG. 10 is a side elevation, with certain parts shown in section, of an eighth embodiment of the device;

FIG. 11 is a section on line XI–XI in FIG. 10;

Figure 1:
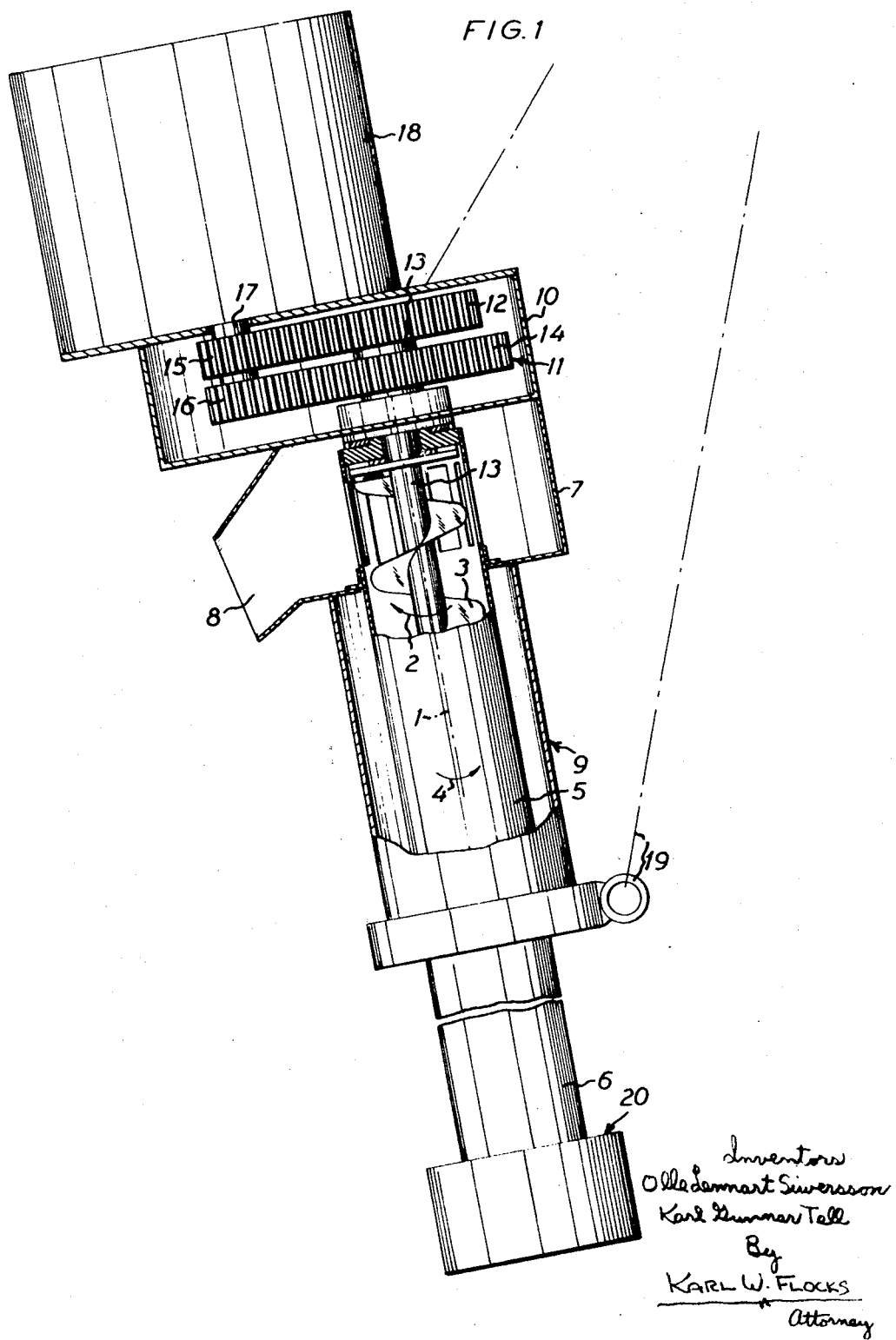
FIG. 1 is a side elevation, partly in section, of a conveyor equipped with a first schematically shown embodiment of the device.

The conveyor shown by way of example in FIG. 1 comprises a screw 3 which is arranged to rotate in the direction of the arrow 2 about an axis 1 indicated by dash and dot lines, and a conduit 5 which is arranged to rotate in the direction of the arrow 4 also about said axis 1. In operation the screw 3 and the conduit 5 therefor rotate in opposite directions at the same r.p.m. and at substantially the same peripheral speed, conveying material from the entrance end 6 of the conveyor to the exit end 7 thereof, where the material leaves the conveyor through a chute 8. The conveyor has a body 9 which at the upper end above the exit end 7 has a chamber 10 for a gearing 11. This gearing includes a gear wheel 12 secured to the screw shaft 13 which is mounted in the body 9, and a gear wheel 14 secured to the conduit 5 which is also mounted in the body 9. The bearings for the screw 3 and the conduit 5 are not shown. Meshing with the gear wheels 12 and 14 are gear wheels 15 and 16 which are secured to the shaft 17 of an electric motor 18 carried by the body 9. Means for supporting the conveyor in a suitable operative position are designated 19.

At the lower end, the entrance end 6, the conveyor has a supplying or guiding device which is generally designated 20 and comprises guide surfaces 21 (FIGS. 2 to 4) by means of which for instance particulate material (not shown) is drawn towards the entrance end 6 and which thus positively supplies the material to the conveyor for further conveyance therein by means of the screw 3 and the conduit 5 therefor. The guide surfaces 21 comprise an open cap around the entrance end 6.

The guide surfaces 21 in addition to including guide surface 23, which is stationary, also includes one or more movable vanes 24 which in the embodiments shown are arranged on the outer side of the conduit 5 adjacent the entrance end 6 and rotate together with said conduit 5 about the axis 1 of the conveyor. The vane or vanes 24 are driven and rotate independently of the screw 3. The vane or vanes 24 are formed as helices or spirals, as will appear from the following. The guide surface 23 may take the form of a variety of upwardly directed cap elements as shown, for example, in FIG. 2—4. Similarly, the movable vanes 24 may take the form of a downwardly directed cap element as shown, for example, in FIG. 5.

The leading end portion 24a of the rotary vane 24 (FIGS. 5 and 6), which portion is disposed on the outer side of the conduit 5 for the screw 3, extends largely radially and thus at a right angle $a$ to the longitudinal axis 1 of the conveyor. The trailing end portion 24b of the vane 24 is arranged outside the end 3a of the screw 3 projecting from the conduit 5 and makes an acute angle $b$ with the axis 1 of the conveyor. The trailing end portion 24b will describe a frustoconical path during the rotation of the vane 24. The angle $a$ of the leading end portion 24a is considerably more obtuse than the acute angle $b$ which the trailing end portion 24b makes with the conveyor axis 1.

The vane 24 thus is bent successively from the conduit 5 towards the end 3a of the screw 3 projecting from the conduit so that it constitutes the open cap surrounding the entrance end 6 of the conveyor. A still better definition of the open cap is realized if, as shown in FIG. 7, the trailing end portion 24c of the vane 24 extends largely parallel with the longitudinal axis 1 of the conveyor. In the embodiment shown in FIG. 6 the vane 24 is connected to the rim 25 of a vessel 26 whose wall 27 and bottom 28 surround the end 3a of the screw 3 projecting from the conduit 5. The vessel 26 is a shape tapering from the rim 25 to the bottom 28. By this arrangement the material to be conveyed will be deflected from the bearing 29 for the screw 3 and the conduit 5, which contributes to keeping the maintenance costs low. The wall 27 and the bottom 28 in this case form a connection between the conduit 5 and the bearing 29 thereof.

Figure 6:
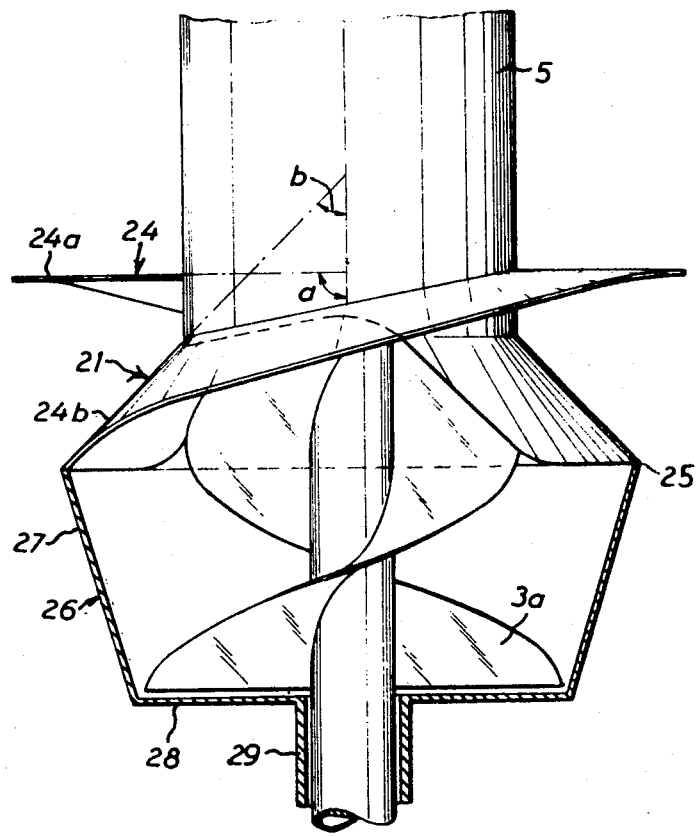
FIG. 6 is a side elevation, partly in section, of a fifth embodiment of the device.
Figure 7:
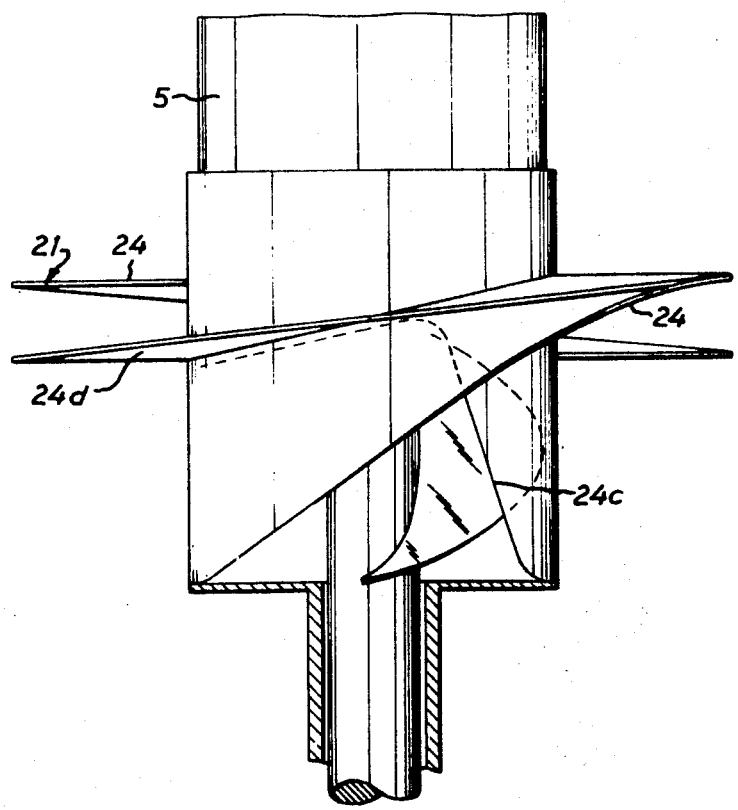
FIG. 7 is a side elevation, partly in section, of a sixth embodiment of the device.

It is advantageous, as shown in FIG. 6, to make the end 3a of the screw 3 projecting from the conduit conical so as to widen towards the free screw end. A still more advantageous design is realized if the end 3a of the screw 3 is situated within and without the end of the conduit 5 has a double thread and a higher pitch than the remaining screw. The embodiments illustrated in FIGS. 5, 6 and 7 are capable of supplying or drawing material to the conveyor and of keeping the conveyor filled with such material even if the screw 3 and conduit 5 rotate at a high speed and large centrifugal forces thus arise, which tend to throw the material out of the region of the entrance end 6 of the conveyor. An additional helically coiled vane 24d is provided in FIG. 7 and should be considered as a portioning means which allows an amount of material, suitable under any operating conditions, to reach the vane 24.

The embodiments hitherto described of the rotary guide surface are formed as helically coiled vanes which draw the material towards the entrance end 6 of the conveyor. However, it is also possible to provide the guide surface in the form of a spiral vane, as will appear from the following.

Figure 9:
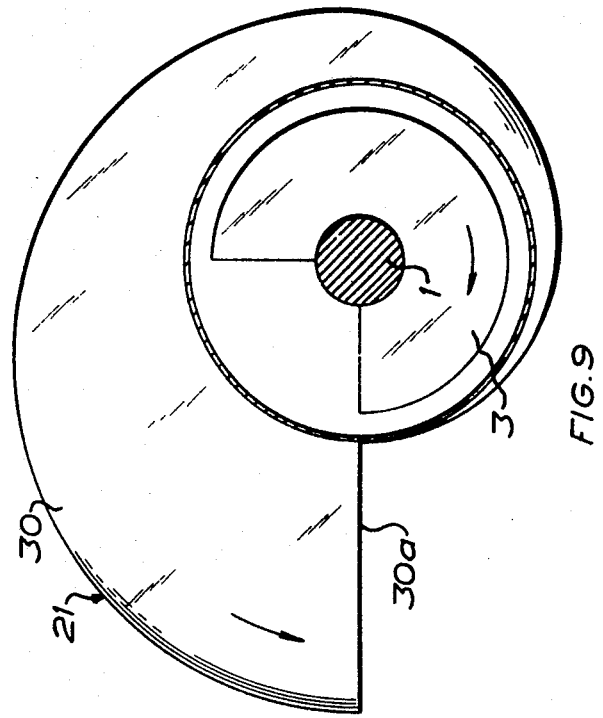
FIG. 9 is a section on line IX–IX in FIG. 8.
Figure 8:
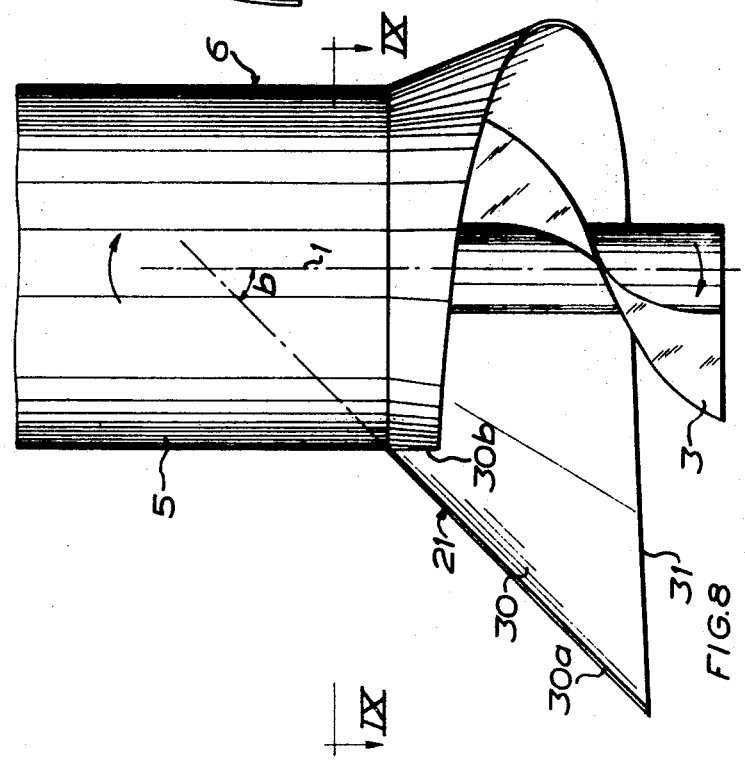
FIG. 8 is a side elevation of a seventh embodiment of the device.

FIGS. 8 and 9 show a spiral vane 30 of such a type, and the leading end portion 30a of the vane makes an acute angle $b$ with the longitudinal axis 1 of the conveyor. The trailing end portion 30b of the vane 30 is largely parallel with the conveyor axis 1. The vane 30 tapers from the leading end portion 30a to the trailing end portion 30b. Experiments have shown that the quantity of material caught by the leading end portion 30a is successively drawn inwardly towards the screw 3 and the entrance end 6 and during this movement the lower edge of the quantity of material will follow a line which broadly coincides with the lower edge 31 of the vane 30.

FIGS. 10 and 11 show another embodiment of a spiral vane, in this instance designated 32 from having the same width as counted from the leading end 32a which makes an acute angle b with the conveyor axis 1, to the trailing end 32b which extends in parallel with the conveyor axis 1. The trailing end 32b is connected at the bottom to a bar 33 which extends diametrically in relation to the conveyor axis 1 and serves to carry a bearing 34 for mounting the lower end of the screw 3 in the conduit 5.

Figure 12:
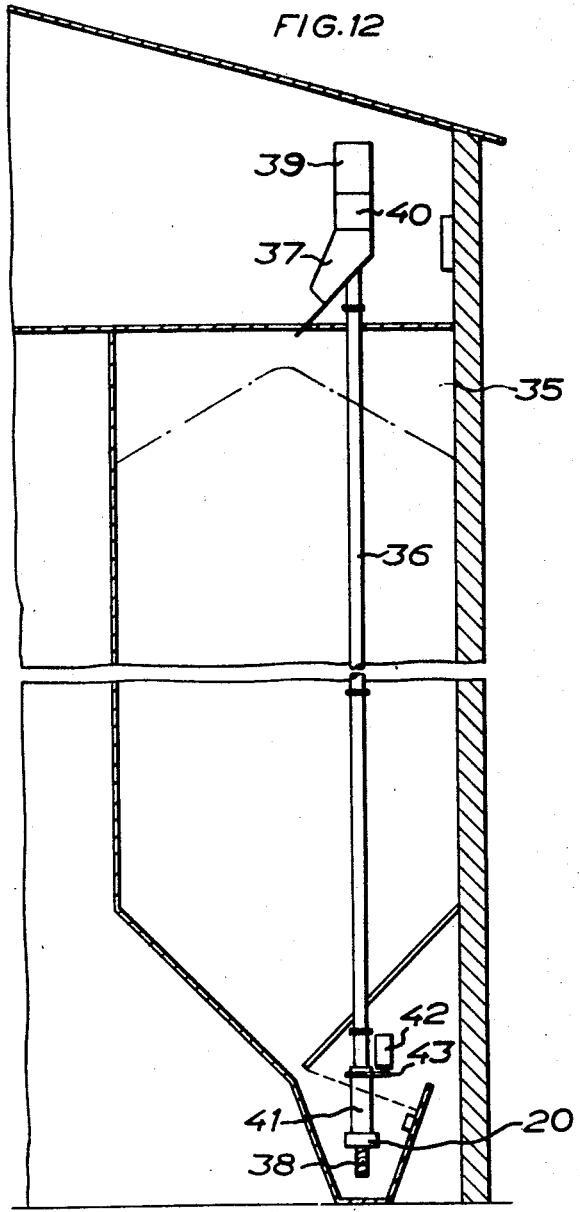
FIG. 12 is a vertical section of a silo having a screw conveyor which is equipped with the device according to the invention.

Finally, FIG. 12 shows an application of the invention. In this instance, the conveyor is mounted vertically in a silo 35 for aeration of corn stored therein. The conveyor has a stationary conduit 36 which at the upper end opens into a delivery hopper 37. For rotation of the screw 38 a motor 39 is mounted at the upper end of the conveyor and connected to the screw 38 by a clutch 40. At the lower end the conveyor has a rotary conduit section 41 which is driven by a motor 42 over a transmission 43. The rotary conduit section 41 is equipped at the lower end with the device 20 according to the invention.

What we claim and desire to secure by Letters Patent is:

1. A device for supplying a drawing material to the entrance end of a conveyor comprising a screw and a conduit therefor, characterized in that the device includes a guide means having at last one guide surface in which at least part of the surface is arranged to rotate about the longitudinal axis of the conveyor independently of the screw thereof, that the guide surface rotatable about the longitudinal axis of the conveyor is formed as a helically or spirally coiled vane in an open cap portion formed by the guide means in its entirety around the entrance end of the conveyor, and that said conduit includes an opening at one end facing into the bottom of said cap portion.

2. A device as claimed in claim 1, in which both the screw and the conduit or part of the latter are arranged to rotate about the longitudinal axis of the conveyor, wherein the leading end portion of the rotary guide vane which portion is situated on the outer side of the conduit, makes an angle (a) with the longitudinal axis of the conveyor, which is considerably more obtuse than the angle (b) that the trailing guide vane end portion situated outside the end of the screw projecting from the conduit makes with said axis.

3. A device as claimed in claim 1 wherein the leading end portion of the guide vane extends largely radially and thus at right angles to the longitudinal axis of the conveyor, and the trailing end portion of the guide vane makes an acute angle (b) with said axis so that said trailing end portion in operation will describe a frustoconical path.

4. A device as claimed in claim 1, wherein the leading end portion of the guide vane makes an acute angle (b) with the longitudinal axis of the conveyor, and the trailing end portion of the guide vane extends largely parallel to said axis.

5. A device as claimed in claim 1, wherein the leading end portion of the guide vane extends largely radially with respect to the longitudinal axis of the conveyor, and the trailing end portion of the guide vane extends largely parallel to said axis.

6. A device as claimed in claim 1, wherein the conduit for the screw and the guide vane are arranged to rotate in a sense opposite to the direction of rotation of the screw, and the guide vane has a smaller pitch than the screw and extends in the same direction as said screw.

7. A device as claimed in claim 1, wherein the guide vane has its maximum width at the leading end portion and tapers from said end portion to the trailing end portion.

8. A device as claimed in claim 7, wherein the guide vane encompasses an angle of broadly 360°.

9. A device as claimed in claim 1 wherein the guide vane is of the same width counted from the leading end portion to the trailing end portion.

10. A device as claimed in claim 1 wherein a portioning vane extends along the line of interconnection of the guide vane and the conduit for the screw and in its entire extension projects at right angles from said conduit.

11. A device as claimed in claim 1 wherein the guide vane is connected to the rim of a vessel which surrounds the end of the screw projecting from the conduit therefor, and the vessel is of a shape tapering from said rim to the vessel bottom.

12. A device as claimed in claim 1, wherein the end of the screw projecting from the conduit therefor is conical so as to widen towards the free end of the screw.

13.. A device as claimed in claim 1 wherein the part of the screw situated within and without the entrance end of the conveyor has a double thread and a higher pitch than the remaining screw.

14. A device as claimed in claim 1, wherein the guide vane encompasses an angle of 180°.

UNITED STATES PATENT OFFICE
CERTIFICATE OF CORRECTION

Patent No. 3,596,751   Dated August 3, 1971

Inventor(s) Olle Lennart SIWERSSON and Karl Gunnar TELL

It is certified that error appears in the above-identified patent and that said Letters Patent are hereby corrected as shown below:

Column 3, line 38, delete "the bottom of".

Signed and sealed this 21st day of March 1972.

(SEAL)
Attest:

EDWARD M. FLETCHER, JR.
Attesting Officer

ROBERT GOTTSCHALK
Commissioner of Patents